United States Patent
Sheoran et al.

(10) Patent No.: US 8,893,508 B2
(45) Date of Patent: Nov. 25, 2014

(54) SYSTEMS AND METHODS FOR DIRECTING COOLING FLOW INTO THE SURGE PLENUM OF AN EXHAUST EDUCTOR COOLING SYSTEM

(75) Inventors: Yogendra Yogi Sheoran, Scottsdale, AZ (US); Bruce Dan Bouldin, Phoenix, AZ (US); John Zimmerer, Pacific Grove, CA (US); Mario Hidalgo, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 253 days.

(21) Appl. No.: 13/483,720

(22) Filed: May 30, 2012

(65) Prior Publication Data

US 2013/0318995 A1 Dec. 5, 2013

(51) Int. Cl.
*F02C 6/08* (2006.01)

(52) U.S. Cl.
USPC .......................................... 60/782

(58) Field of Classification Search
USPC ................ 60/39.5, 39.83, 770, 771, 782; 244/57–58, 117 A; 181/213, 218, 220, 181/264, 282
See application file for complete search history.

(56) References Cited

U.S. PATENT DOCUMENTS

| 3,286,787 | A | * | 11/1966 | Wirt ............................... 181/213 |
| 5,265,408 | A | * | 11/1993 | Sheoran et al. ................. 60/782 |
| 6,092,368 | A | | 7/2000 | Ishii et al. |
| 6,260,800 | B1 | | 7/2001 | Snell |
| 6,615,576 | B2 | | 9/2003 | Sheoran et al. |
| 7,152,410 | B2 | | 12/2006 | Sheoran et al. |
| 7,900,459 | B2 | * | 3/2011 | Farah ............................. 60/770 |
| 7,966,825 | B2 | | 6/2011 | Judd |
| 8,235,170 | B1 | * | 8/2012 | Ertz et al. ...................... 181/213 |
| 2005/0274117 | A1 | * | 12/2005 | Sheoran et al. ................. 60/782 |
| 2008/0245062 | A1 | | 10/2008 | Dionne |
| 2009/0078496 | A1 | * | 3/2009 | Francisco et al. ............. 181/213 |
| 2011/0070076 | A1 | | 3/2011 | Sheoran et al. |

FOREIGN PATENT DOCUMENTS

CA 2591357 A1 12/2008

* cited by examiner

*Primary Examiner* — Phutthiwat Wongwian
(74) *Attorney, Agent, or Firm* — Ingrassia Fisher & Lorenz, P.C.

(57) ABSTRACT

An eductor assembly comprises a primary nozzle configured to discharge turbine exhaust gas therefrom. The eductor assembly further comprises a cooler plenum having an inlet and an outlet and a surge plenum at least partially surrounding the cooler plenum and the nozzle, the surge plenum for conducting a surge flow. Cooling air flows through a vent between the cooler plenum and the surge plenum when there is no surge flow.

12 Claims, 6 Drawing Sheets

SYSTEMS AND METHODS FOR DIRECTING COOLING FLOW INTO THE SURGE PLENUM OF AN EXHAUST EDUCTOR COOLING SYSTEM

TECHNICAL FIELD

Embodiments described herein relate to an exhaust eductor system, and more particularly, to a system and method for providing cooler air from an oil cooling plenum to the surge plenum of an eductor exhaust system.

BACKGROUND

Many modern aircraft are equipped with an auxiliary power unit ("APU") that generates and provides electrical and pneumatic power to various parts of the aircraft for tasks such as environmental cooling, lighting, powering electronic systems, and main engine starting. Typically, such APUs are located in the aft section of the aircraft such as the tail cone and are isolated by a firewall. During operation, an APU produces exhaust gas that is directed through a nozzle and out of the aircraft through an exhaust opening. The nozzle may communicate with an eductor system that utilizes the APU exhaust gas to draw and direct other gases through the aircraft.

To achieve this, eductor systems have been developed that include a first plenum (i.e. the oil cooler plenum) for drawing gas across an oil cooler, and a second plenum (i.e. the surge plenum) for directing surge flow to an exhaust duct (i.e. air not required by the aircraft to satisfy its pneumatic requirements, commonly referred to as surge bleed flow). During normal operation with no surge flow, the surge plenum is a deadheaded cavity with its aft facing outlet exposed to the mixed eductor flow; i.e. the turbine exhaust at perhaps 1000° F. and the cooling air from the cooling plenum at approximately 200° F. Thus, the mixed eductor flow, which may be about 500° F., enters the surge plenum, circulating in and out of the surge plenum, and heating the surge plenum to approximately 500° F., exceeding the strict temperature limits (i.e. 450° F.) being imposed on the outer surfaces of the APU including the surge plenum.

In accordance with the forgoing, it would be desirable to provide a system and method for directing a cooling flow into the surge plenum to reduce the temperature of the surge plenum surfaces when there is no surge flow.

BRIEF SUMMARY

This summary is provided to introduce a selection of concepts in a simplified form that are further described below in the detailed description. This summary is not intended to identify key features or essential features of the claimed subject matter, nor is it intended to be used as an aid for determining the scope of the claimed subject matter.

In accordance with the foregoing, there is provided an eductor assembly comprising a primary nozzle configured to discharge turbine exhaust gas therefrom. The eductor assembly further comprises a cooler plenum having an inlet and an outlet, a surge plenum at least partially surrounding the cooler plenum and the nozzle, the surge plenum for conducting a surge flow, and a vent between the cooler plenum and the surge plenum through which gas flows from the cooler plenum into the surge plenum when there is no surge flow.

In accordance with the foregoing, there is also provided a method for cooling the external surfaces of a surge plenum in an eductor assembly in an APU of the type wherein the surge plenum at least partially surrounds a cooler plenum. The method comprises introducing cooler air from the cooler plenum into the surge plenum when there is no surge flow in the surge plenum.

An eductor assembly is also provided that comprises a primary nozzle configured to discharge turbine exhaust therefrom, a cooler plenum, a surge plenum at least partially surrounding the cooler plenum and the nozzle, the cooler plenum for conducting surge flow, a wall separating the cooler plenum and the surge plenum, and a passive valve in the wall for conducting cooler air from the cooler plenum to the surge plenum when there is no surge flow.

DETAILED DESCRIPTION

The following detailed description is merely exemplary in nature and is not intended to limit the disclosed embodiments or the application and uses thereof. Furthermore, there is no intention to be bound by any theory presented in the preceding background or the following detailed description.

Figure 1:
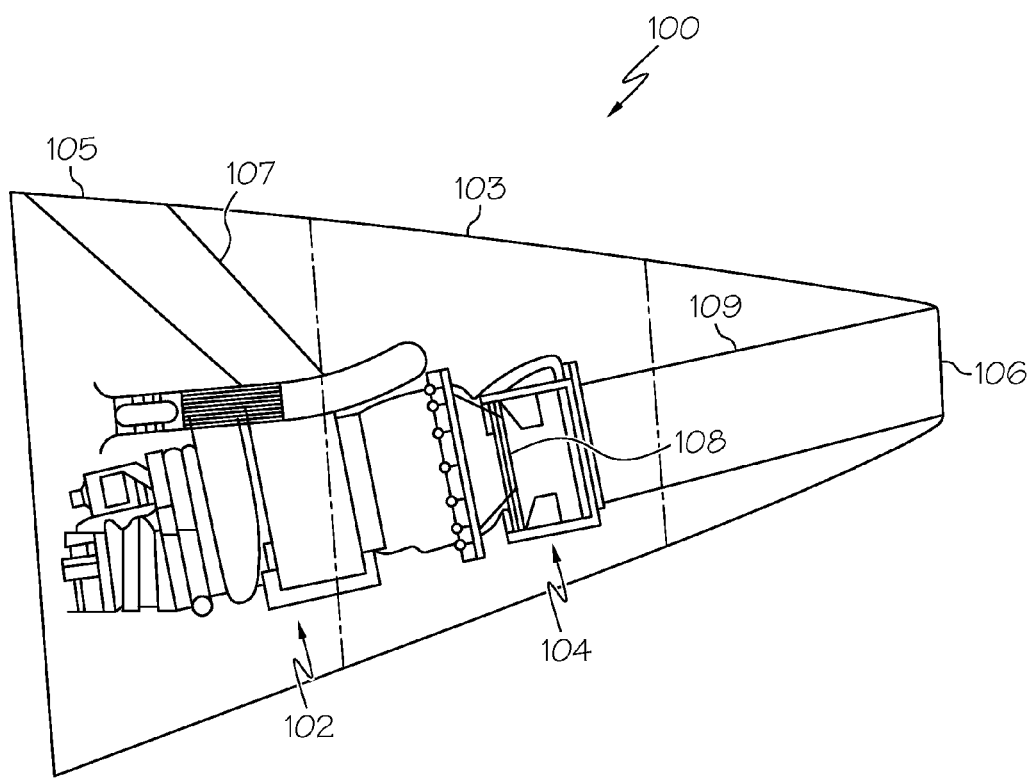
FIG. 1 is a cross-section view of an aircraft including a power unit and eductor system disposed therein.

Turning now to the description, FIG. 1 illustrates a housing 100 within which a power unit 102 and an eductor 104 are disposed. The housing 100, which may be an aircraft tail cone or helicopter housing, is generally conical and has a sidewall 103 and inlet and exhaust openings 105, 106 that are formed therein. The power unit 102, which may be an auxiliary power unit ("APU"), may be used to drive a number of non-illustrated devices, including, for example, a gearbox, a generator, or a load compressor, is mounted within the housing 100 and receives air from an inlet duct 107 that extends between the power unit 102 and the inlet opening 105. The power unit 102 includes a nozzle 108 that communicates with the eductor 104. It will be appreciated that the power unit 102 and eductor 104 may indirectly or directly communicate with each other. In any case, exhaust gas from the power unit 102 flows through the eductor 104 and an exhaust duct 109 and exits the aircraft via the exhaust opening 106.

Figure 2:
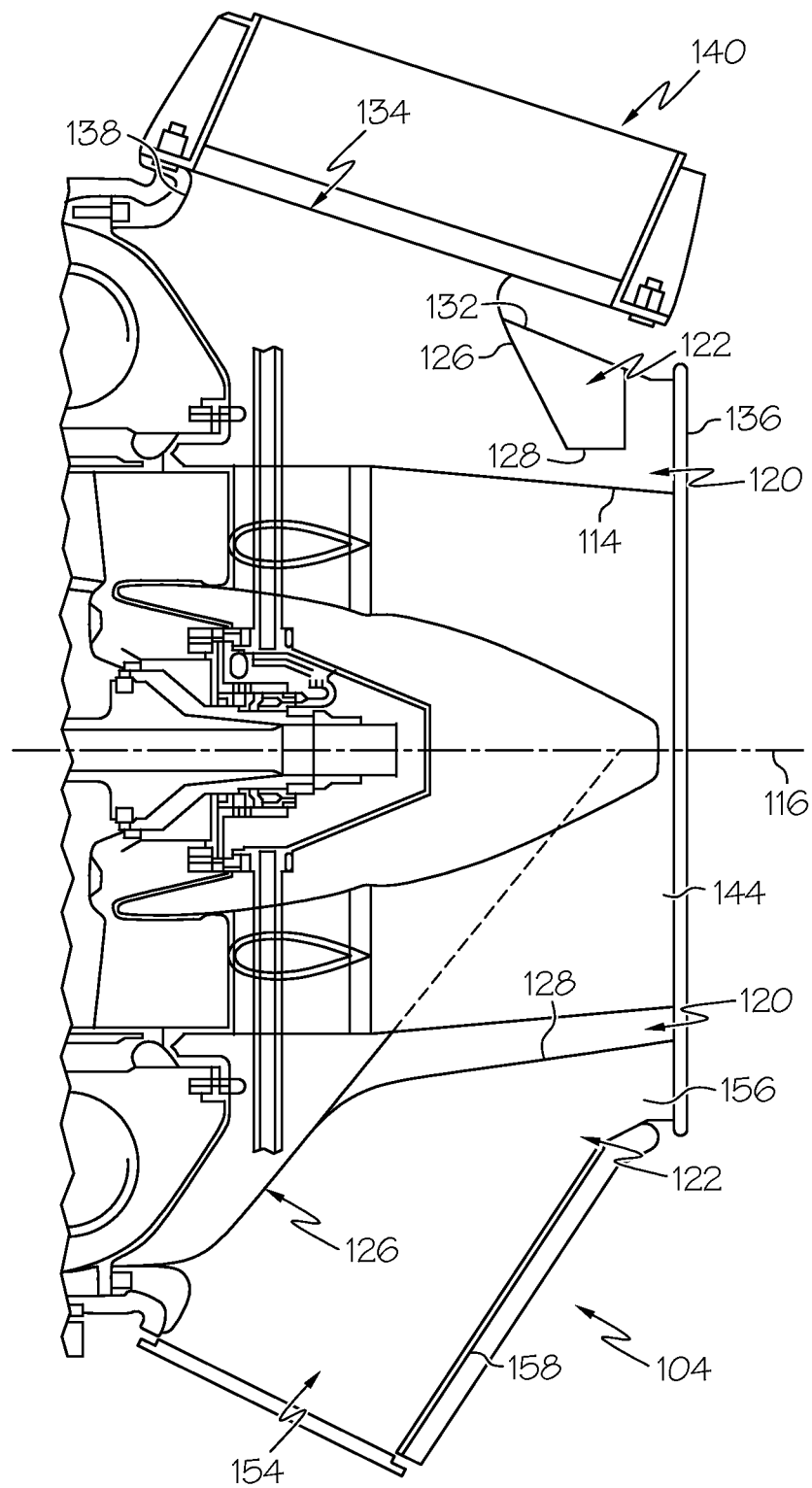
FIG. 2 is a cross-sectional view of an exemplary eductor oil cooler and surge flow plenum assembly that may be incorporated into the tail cone depicted in FIG. 1 in accordance with the prior art.

The eductor oil cooler and surge flow plenum assembly 104 is configured to employ the flow of high velocity exhaust gas to draw other gas through the aircraft. As shown in FIG. 2, the assembly 104 includes an oil cooler plenum 120 and a surge flow plenum 122 that are disposed along the longitudinal axis 116 and are circumferentially around the nozzle 114. The oil cooler plenum 120 and surge flow plenum 122 are separated from each other and are each defined, in part, by a wall 126. More particularly, the wall 126 has an inner surface 128 that, together with the nozzle 114, forms the oil cooler plenum 120. Wall 126, together with an outer wall 132, forms the surge flow plenum 122.

The oil cooler plenum 120 includes a fluid inlet 134 and a fluid outlet 136. The fluid inlet 134 communicates with an oil cooler duct 138 within which an oil cooler 140 is disposed. Preferably, the oil cooler plenum 120 surrounds an entire circumference of the nozzle 114 to maximize contact between high velocity APU exhaust gas that flows through the nozzle 114 and the gas that is pulled through the oil cooler plenum 120 to thereby increase pumping of gas through the fluid inlet 134. To further increase pumping of gas through the fluid inlet 134, the fluid outlet 136 is aligned with an end 144 of the nozzle 114. Thus, gas flowing through the fluid outlet 136 will be entrained by the high velocity APU exhaust gas and both will flow together through the exhaust duct 109 (shown in FIG. 1).

It will be appreciated that the volume of space needed to accommodate the cooled gas decreases as distance from the fluid inlet 134 increases, and that the gas in the oil cooler plenum 120 preferably flows around the circumference of the nozzle 114 at a substantially constant flow velocity. In this regard, the wall 126 may slope toward the longitudinal axis 116 forward to aft and is disposed nonconcentric thereto. As a result, the oil cooler plenum 120 includes a plurality of variously sized radial cross-sectional areas at different axial locations along the longitudinal axis 116 and a plurality of variously sized axial cross-sectional areas at different angular locations relative to the longitudinal axis 116. The cross-sectional areas, which, as previously mentioned, preferably gradually decrease in size when the distance from the fluid inlet 134 increases, may be disposed axisymmetrically about the longitudinal axis 116.

Returning to FIG. 2, the surge flow plenum 122 is partially defined by the walls 126, 132 and includes a fluid inlet 154 and a fluid outlet 156. The fluid inlet 154 communicates with a surge bleed entry duct 158 that is coupled to or integrally formed as part of the outer wall 132. The fluid outlet 156 is preferably axially aligned with and coterminous with the oil cooler plenum fluid outlet 136.

Similar to the oil cooler plenum 120, the surge flow plenum 122 preferably includes a plurality of variously sized axial cross-sectional areas at different angular locations relative to the longitudinal axis 116. Most preferably, the areas of the axial cross-sections gradually decrease as the distance away from the surge flow fluid inlet section increases without overlapping the oil cooler plenum 120. In other embodiments, the oil cooler plenum 120 may surround the first circumferential section of the nozzle 114 and the surge flow plenum 122 may surround the second circumferential section and a portion of the first circumferential section.

During operation, the APU 102 exhausts high velocity exhaust gas out of the nozzle 114. When gas is needed to cool the oil cooler 140, the gas enters the oil cooler 140, travels through fluid inlet 134, and flows through the oil cooler duct 138 into the oil cooler plenum 120. When the gas exits the oil cooler fluid outlet 136, it is pulled through the exhaust duct 109 by the high velocity APU exhaust gas. The pull of the APU exhaust gas causes additional gas to be pumped into the oil cooler plenum 120. Occasionally, surge flow gas may be dumped into the surge bleed entry duct 158 and into the surge flow plenum 122. The surge flow gas, which is already traveling at a high velocity, flows directly into the exhaust duct 109 and out the exhaust opening 106.

Figure 3:
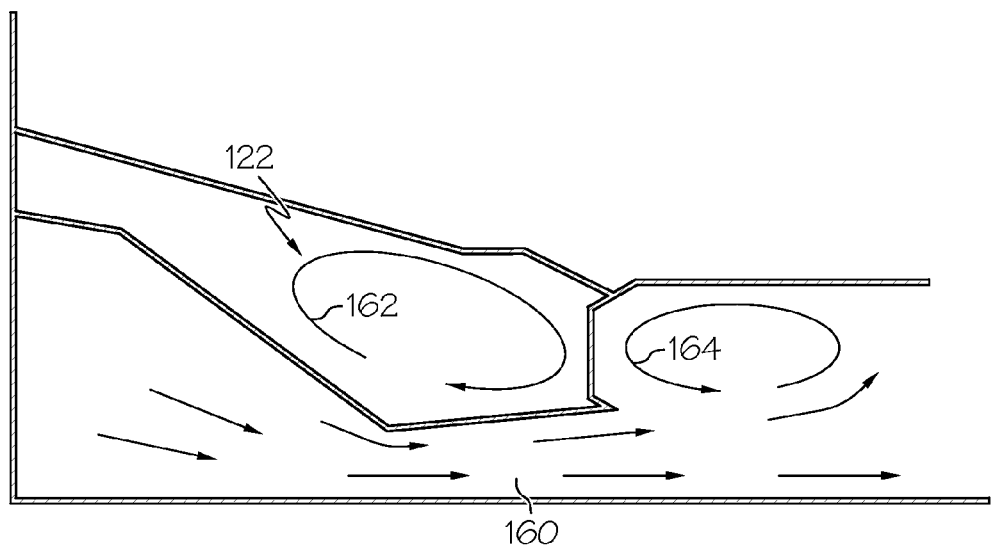
FIG. 3 is a cross-sectional view of the exemplary eductor oil cooler and surge flow plenum illustrating the recirculation in the surge plenum when there is no surge flow.

As stated earlier, when there is no surge flow, the surge plenum becomes a dead-headed cavity with its aft outlet exposed to the mixed eductor flow which is about 500° F. This flow enters the surge plenum 122 and may continuously recirculate in and out of the surge plenum 122 heating the surge plenum surface to an unacceptable level. This situation is illustrated in FIG. 3. With no surge flow in to surge plenum 122, heated mixed eductor flow 160 recirculates in and out of surge plenum 122 as is indicated by arrows 162 and 164.

Embodiments described herein contemplate introducing cooler air from the oil cooler plenum into the surge plenum during normal APU operation when there is no surge flow. It is further contemplated that this may be accomplished by positioning at least one vent in a wall between the oil cooler plenum and the surge plenum. It is still further contemplated that the vent may be a tube that includes a scarfed or scooped end (e.g. a thumbnail scoop) that extends into the oil cooler plenum and is positioned to function as a diverter to scoop cooler air and direct it into the surge plenum. The air exit portion of the tube that extends into the surge plenum should be long enough so as to prevent surge flow from entering into the oil cooler plenum during a surge event; i.e. the tube protruding into the surge plenum has a high entry pressure loss. Thus, the arrangement acts as a passive one way valve.

Figure 4:
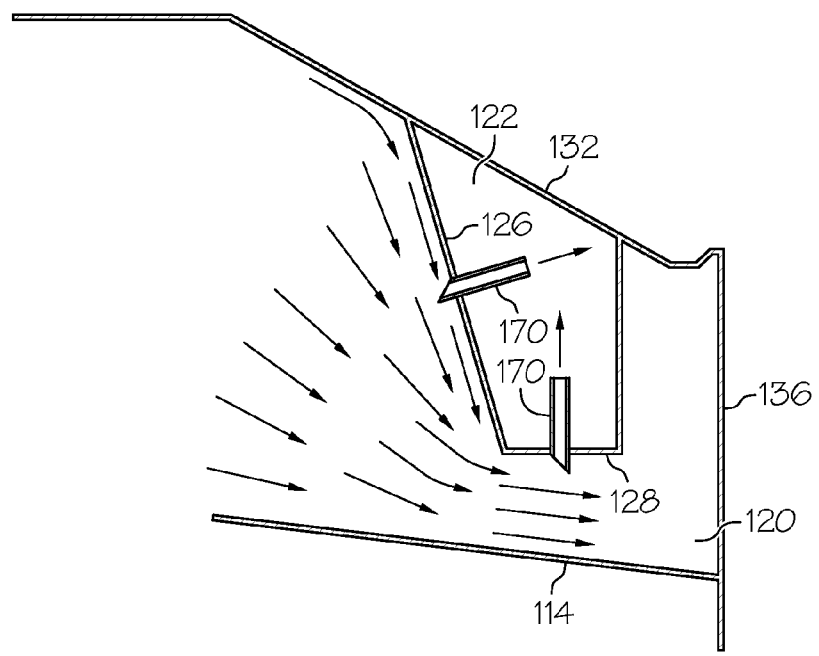
FIG. 4 is a cross-sectional view of a first embodiment wherein cooler air is deflected from the oil cooler plenum into the surge plenum.

FIG. 4 is a partial cross-sectional view in accordance with a first embodiment. As can be seen, a hollow tube 170 is shown extending through a wall of surge plenum 122 at first and second locations each of which will be discussed separately. In the first location, tube 170 extends through an inclined wall 126 of surge plenum 122 to an area of the cooler plenum characterized by lower speed oil cooler flow. In the second location, tube 170 extends through wall 128 of surge plenum 122 to an aft area characterized by a higher speed (e.g. 80-110 feet/second) oil cooler flow. In each location, tube 170 preferably extends substantially perpendicularly through walls 126 and 128, respectively, as the case may be.

Tubes 170 may be manufactured from a variety of materials but are preferably made from a heat resistant weldable alloy. For maximum efficiency, the tubes should be manufactured so as to exhibit characteristics that discourage backflow through the tubes; i.e. flow from the surge plenum 122 to the oil cooler 120 during a surge event. To this end, the tubes may have a length between 0.25 inch and 2.0 inches and preferably between 0.75 inch and 1.25 inches. The diameter of the tube is preferably one-half to one-third the tube's length. These criteria will provide sufficient entry losses and friction losses to prevent flow back into the oil cooler plenum 120.

In order to deflect cooler air flowing in the oil cooler plenum 120 into the surge plenum 122, it is preferable to provide an obstruction at the end of the tube that resides within oil cooler plenum 120 and deflects cooler air in oil cooler plenum 120 through the tube and into the surge plenum 122.

Figure 5A:
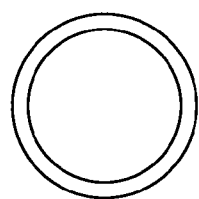
FIGS. 5A, 5B and 5C are side, top and isometric views of a beveled tube for use in conjunction with the embodiment shown in FIG. 4.
Figure 5B:
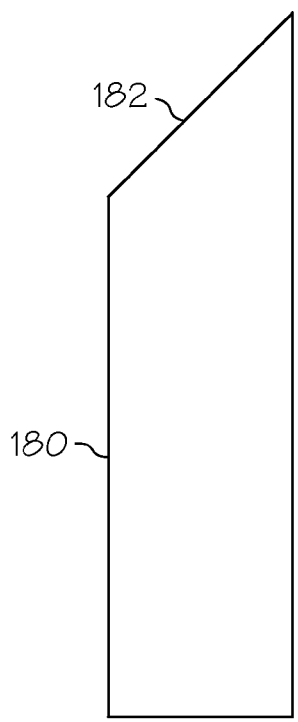
Figure 5C:
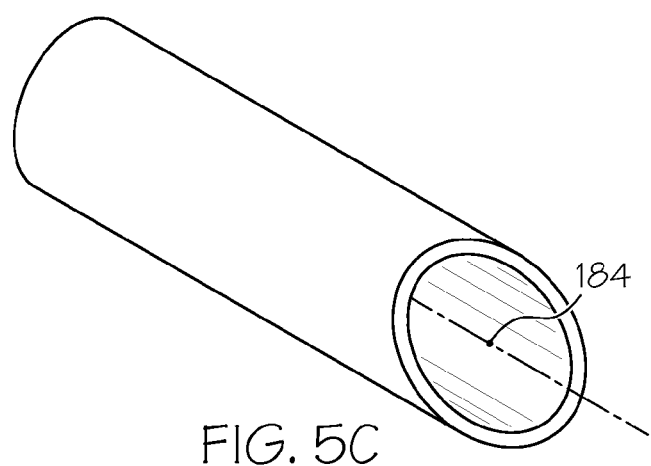
Figure 6A:
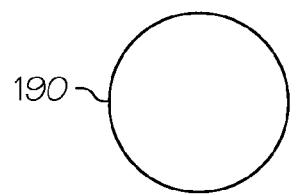
FIGS. 6A, 6B and 6C are side, top and isometric views of a tube terminating with a scoop for use in conjunction with the embodiment shown in FIG. 4.
Figure 6B:
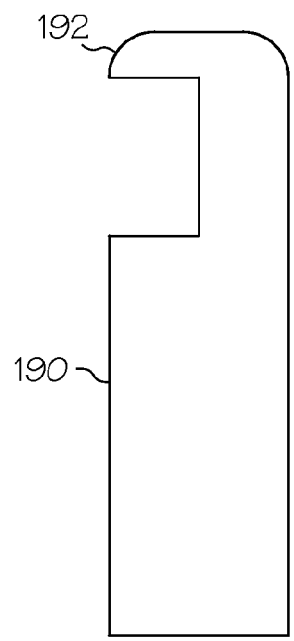
Figure 6C:
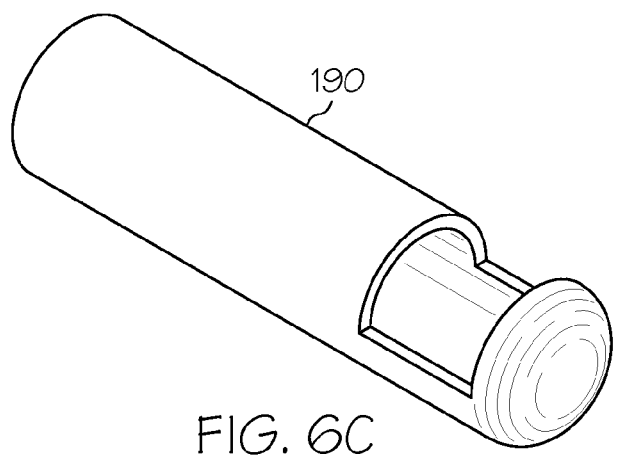

In a first embodiment, the obstruction may be a beveled portion of the tube. For example, FIGS. 5A, 5B and 5C are top, side, and isometric views, respectively, of a beveled tube 180. The beveled portion 182 will extend into cooler plenum 120 and the bevel opening 184 will face the direction of air flow in cooler plenum 120. Alternatively, in another embodiment, FIGS. 6A, 6B and 6C are top, side, and isometric views, respectively of a tube 190 that terminates with a scoop 192 which redirects air flowing in the cooler plenum 120 through tube 190 and into the surge plenum 122.

Figure 7:
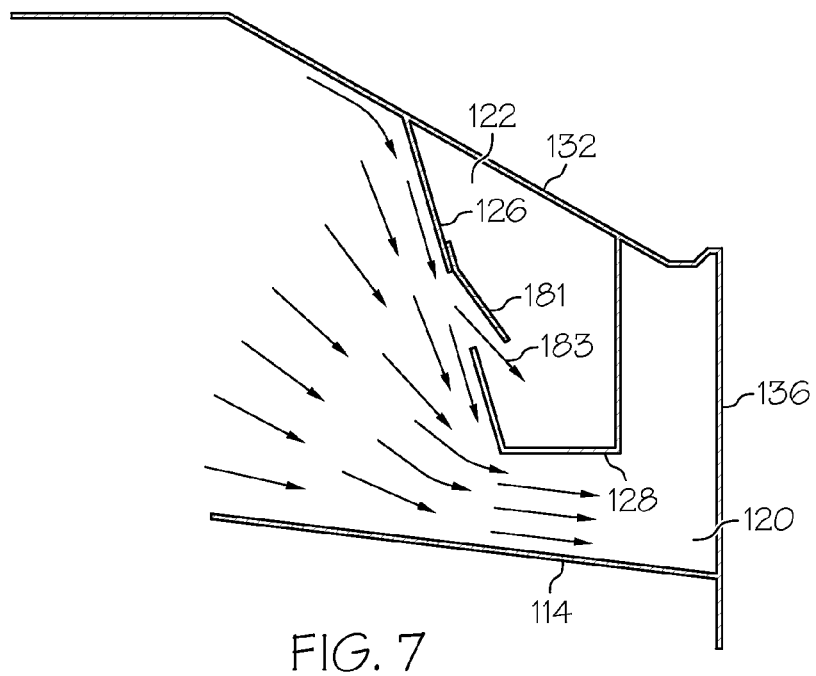
FIG. 7 is a cross-sectional view of yet another embodiment wherein cooler air enters the surge plenum from the cooler plenum via a one-way flap.

FIG. 7 is a cross-sectional view of a further embodiment wherein cooler air is directed from the oil cooler plenum 120 into the surge plenum 122 through a flap 181 when there is no surge flow as indicated by arrow 183. A surge flow will prevent flap 181 from opening.

Figure 8:
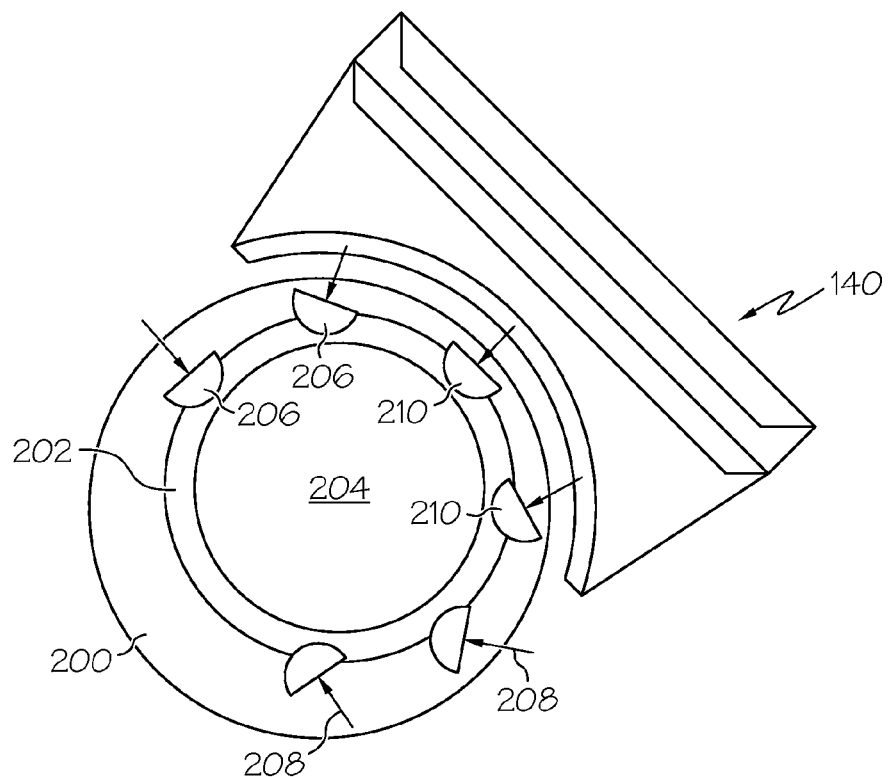
FIG. 8 illustrates yet another embodiment utilizing a plurality of tubes for deflecting cooler air from the cooler plenum into the surge plenum.

FIG. 8 functionally illustrates an oil cooler plenum 200, a surge plenum 202, and an exhaust duct 204 in accordance with a still further embodiment. Also shown are a plurality of obstructions 206 (e.g. scoops) for deflecting air from cooler plenum 200 to surge plenum 202. It is known that the air exits the oil cooler 140, enters the air cooler plenum 200, and circulates around the plenum resulting in velocity vectors 208 having different directions in different parts of cooler plenum 200. Thus, the obstructions 206 in the form of bevels, scoops and the like as previously described are positioned such that their openings 210 are substantially perpendicular to the oil cooling flow velocity vectors 208 at their respective locations. The multiple scoops 206 provide substantially uniform cooling of surge plenum 202.

Thus there has been provided a system and method for directing a cooling air flow into the surge plenum to reduce the temperature of the surge plenum surfaces when there is no surge flow.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An eductor assembly, comprising:
   a primary nozzle configured to discharge turbine exhaust gas therefrom;
   a cooler plenum having an inlet and an outlet;
   a surge plenum at least partially surrounding the cooler plenum and the nozzle, the surge plenum for conducting a surge flow;
   a vent between the cooler plenum and the surge plenum through which air flows from the cooler plenum into the surge plenum when there is no surge flow; and
   a tube coupled to the vent and extending into the surge plenum, the tube extending substantially perpendicularly from a first wall separating the surge plenum and the cooler plenum, the tube comprising an obstruction coupled to an end of the tube and extending into the cooler plenum for deflecting gas into the tube.

2. An eductor assembly according to claim 1 wherein the vent extends through the first wall.

3. An eductor system according to claim 1 further comprising
   a second wall separating the cooler plenum and the surge plenum aft of the first wall and wherein the vent extends through the second wall, the second wall extending further into the primary nozzle than the first wall.

4. An eductor assembly according to claim 1 wherein the obstruction is a bevel at the end of the tube.

5. An eductor assembly according to claim 1 wherein the obstruction is a scoop at the end of the tube.

6. An eductor assembly according to claim 1 further comprising a flap coupled to the vent that opens when there is no surge flow.

7. An eductor assembly according to claim 1 wherein the tube extends approximately 0.25 inch to 2.0 inches into the surge plenum.

8. An eductor assembly according to claim 7 wherein the diameter of the tube is in the range of one-third to one-half the length of the tube.

9. An eductor assembly according to claim further comprising:
   a plurality of openings through the first wall and spaced around the cooler plenum;
   a plurality of tubes, each tube coupled to receive cooler air from the cooler plenum and direct it into the surge plenum; and
   a plurality of obstructions, each obstruction coupled to one of the plurality of tubes for deflecting cooler air into its associated tube.

10. An eductor assembly according to claim 9 wherein each one of the plurality of obstructions is oriented to align with the local cooler plenum flow.

11. An eductor assembly comprising:
    a primary nozzle configured to discharge turbine exhaust therefrom;
    a cooler plenum;
    a surge plenum at least partially surrounding the cooler plenum and the nozzle, the cooler plenum for periodically conducting a surge flow;
    a wall separating the cooler plenum and the surge plenum;
    a passive valve in the wall for conducting cooler air from the cooler plenum to the surge plenum when there is no surge flow, the passive valve comprising a tube extending from the wall into the surge plenum; and
    a diverter coupled to the tube and extending into the cooler plenum for diverting air flowing in the cooler plenum through the tube.

12. An eductor assembly according to claim 11 wherein the tube extends into the surge plenum a distance in the range of two to three times the diameter of the tube.

\* \* \* \* \*

UNITED STATES PATENT AND TRADEMARK OFFICE
CERTIFICATE OF CORRECTION

PATENT NO. : 8,893,508 B2  
APPLICATION NO. : 13/483720  
DATED : November 25, 2014  
INVENTOR(S) : Sheoran et al.

Page 1 of 1

It is certified that error appears in the above-identified patent and that said Letters Patent is hereby corrected as shown below:

In the Claims

Column 6, line 22, "An educator assembly according to claim further comprising:" should be changed to --An educator assembly according to claim 1 further comprising:--.

Signed and Sealed this  
First Day of December, 2015

Michelle K. Lee  
*Director of the United States Patent and Trademark Office*